(12) United States Patent  (10) Patent No.: US 6,902,435 B1
Cheng  (45) Date of Patent: Jun. 7, 2005

(54) ELECTRICAL CONNECTOR ADAPTED FOR USE WITH DIFFERENT ELECTRONIC CARDS

(75) Inventor: Kevin Cheng, Taipei (TW)

(73) Assignee: DataFab System, Inc., (TW)

( * ) Notice: Subject to any disclaimer, the term of this patent is extended or adjusted under 35 U.S.C. 154(b) by 0 days.

(21) Appl. No.: 10/761,951

(22) Filed: Jan. 21, 2004

(51) Int. Cl.$^7$ ............................................. H01R 24/00
(52) U.S. Cl. ..................... 439/630; 439/65; 439/945; 439/946; 361/737
(58) Field of Search .................... 439/630, 65, 945, 439/946, 76.1; 361/737

(56) References Cited

U.S. PATENT DOCUMENTS

| | | | |
|---|---|---|---|
| 5,906,516 A | * | 5/1999 | Sato et al. .................... 439/630 |
| 6,699,053 B2 | * | 3/2004 | Kuroda ........................ 439/630 |
| 6,717,805 B2 | * | 4/2004 | Liu et al. ..................... 439/630 |
| 6,746,280 B1 | * | 6/2004 | Lu et al. ...................... 439/630 |

* cited by examiner

*Primary Examiner*—Tho D. Ta
(74) *Attorney, Agent, or Firm*—Kenneth C. Brooks

(57) ABSTRACT

An electrical connector includes a dielectric connector housing confining a card receiving groove and having a front open side, and top and bottom walls. A terminal connecting board is mounted on a rear side of the housing, and is formed with circuit traces that interconnect electrically and respectively conductive vias and solder pads. First conductive terminals are mounted on one of the top wall and an inner surface of the bottom wall. Each first conductive terminal has a first coupling end portion extending in and connected electrically to a corresponding conductive via, and a first contacting end portion projecting into the card receiving groove. Second conductive terminals are mounted on an outer surface of the bottom wall. Each second conductive terminal has a second coupling end portion extending through the rear side of the housing, and a second contacting end portion projecting into the card receiving groove.

13 Claims, 6 Drawing Sheets

ELECTRICAL CONNECTOR ADAPTED FOR USE WITH DIFFERENT ELECTRONIC CARDS

BACKGROUND OF THE INVENTION

1. Field of the Invention

The invention relates to a connector, more particularly to an electrical connector adapted for use with different electronic cards.

2. Description of the Related Art

Various types of electronic cards, such as a memory stick (MS) card, a secure digital (SD) card, a multimedia card (MMC), a smart media (SM) card and an XD card, are currently available for storing electrical data of portable electronic devices, such as a personal digital assistant (PDA), a digital camera (DC), a digital video camera (DV), an MP3 player, etc.

FIGS. 1 and 2 illustrate a conventional electrical connector assembly suitable for use with different electronic cards, such as MS, SM, SD and MMC cards. The conventional electrical connector assembly includes a circuit board 11 formed with a plurality of solder contacts 111, a first connector 2 mounted on the circuit board 11, and a second connector 1 mounted on the circuit board 11 and disposed adjacent to the first connector 2.

The first connector 2 includes a dielectric housing, which is composed of a base 20 and a cover 21 mounted on the base 20, having opposite first and second open ends 25, 27 and confining a card receiving space 23, and a set of first conductive terminals 24, 26, 28 mounted on the base 20, each of which has a first coupling end portion 241, 261, 281 extending outwardly of the dielectric housing through the second open end 27 and coupled electrically to a corresponding one of the solder contacts 111 on the circuit board 11, and a first contacting end portion 242, 262, 282 projecting into the card receiving space 23. The first contacting end portions 242 of the first conductive terminals 24 contact electrically and respectively a set of conductive contacts on one of standard SD and MMC cards when the latter is inserted into the card receiving space 23 through the second open end 27. The first conductive terminals 26, 28 can be reserved for switching and/or circuit protection purposes. The first connector 2 further includes a set of second conductive terminals 22 mounted on the base 20, each of which has a second coupling end portion 221 extending outwardly of the dielectric housing through the first open end 25 and coupled electrically to a corresponding one of the solder contacts 111 on the circuit board 11, and a second contacting end portion 222 projecting into the card receiving space 23 and contacting electrically a corresponding one of a set of conductive contacts on an SM card when the latter is inserted into the card receiving space 23 through the second open end 27.

The second connector 1 includes a connector seat 13 mounted on the circuit board 11 and disposed adjacent to the first open end 25 of the dielectric housing, and a set of third conductive terminals 12 mounted in the connector seat 13. Each third conductive terminal 12 has a third coupling end portion 121 extending outwardly of the connector seat 13 and distal to the first open end 25 of the dielectric housing, and coupled electrically to a corresponding one of the solder contacts 111 on the circuit board 11, and a third contacting end portion 122 opposite to the third coupling end portion 121, extending outwardly of the connector seat 13 and into the card receiving space 23 through the first open end 25 of the dielectric housing, disposed above the second conductive terminals 22, and contacting electrically a corresponding one of a set of conductive contacts on an MS card when the latter is inserted into the card receiving space 23 through the second open end 27.

It is noted that the solder contacts 111 on the circuit board 11 are split into three groups, i.e., a first group allocated for connection with the first coupling end portions 241, 261, 281 of the first conductive terminals 24, 26, 28 and disposed adjacent to the second open end 27 of the dielectric housing, a second group allocated for the second coupling end portions 221 of the second conductive terminals 22 and disposed between the first open end 25 of the dielectric housing and the connector seat 13, and a third group allocated for the third coupling end portions 121 of the third conductive terminals 12 and disposed distal to the first open end 25 of the dielectric housing, thereby resulting in a relatively complicated soldering process during fabrication. Furthermore, due to the use of the circuit board 11 that has a size sufficient to accommodate the first and second connectors 1, 2 thereon, the conventional electrical connector assembly has a relatively large thickness. Moreover, in view of the exposed first coupling end portions 241, 261, 281, oxidation and damage can easily occur.

SUMMARY OF THE INVENTION

Therefore, the object of the present invention is to provide an electrical connector that is adapted for use with different electronic cards and that can overcome the aforesaid drawbacks of the prior art.

According to one aspect of the present invention, there is provided an electrical connector adapted for establishing electrical connection between an electronic card and a circuit board. The electronic card is formed with a set of conductive contacts. The circuit board is formed with a plurality of solder contacts. The electrical connector comprises:

a dielectric connector housing having opposite top and bottom walls, and opposite lateral walls interconnecting the top and bottom walls and cooperating with the top and bottom walls so as to confine a card receiving groove, the dielectric connector housing further having a front open side for access into the card receiving groove, and a rear side, the top wall having a first inner mounting surface, and a first outer mounting surface opposite to the first inner mounting surface, the bottom wall having a second inner mounting surface, and a second outer mounting surface opposite to the second inner mounting surface;

a terminal connecting board mounted on the rear side of the dielectric connector housing and having a first surface adjacent to the rear side of the dielectric connector housing, and a second surface opposite to the first surface, the terminal connecting board being formed with a plurality of circuit traces, a plurality of conductive vias extending from the first surface to the second surface and coupled electrically and respectively to the circuit traces, and a plurality of solder pads formed on the second surface, adapted to be connected electrically and respectively to the solder contacts on the circuit board, and coupled electrically and respectively to the circuit traces such that each of the conductive vias is adapted to be coupled electrically to a corresponding one of the solder contacts on the circuit board via a corresponding one of the circuit traces and a corresponding one of the solder pads;

a set of first conductive terminals mounted on one of the first inner and outer mounting surfaces of the top wall and the second inner mounting surface of the bottom wall, each of the first conductive terminals having a first coupling end portion extending in and connected electrically to a corresponding one of the conductive vias in the terminal connecting board, and a first contacting end portion opposite to the first coupling end portion, projecting into the card receiving groove, and adapted to contact electrically a corresponding one of the conductive contacts on the electronic card when the electronic card is inserted into the card receiving groove through the front open side of the dielectric connector housing; and a set of second conductive terminals mounted on the second outer mounting surface of the bottom wall, each of the second conductive terminals having a second coupling end portion extending outwardly of the rear side of the dielectric connector housing and adapted to be connected electrically and directly to a corresponding one of the solder contacts on the circuit board, and a second contacting end portion opposite to the second coupling end portion, projecting into the card receiving groove, and adapted to contact electrically a corresponding one of the conductive contacts on the electronic card when the electronic card is inserted into the card receiving groove through the front open side of the dielectric connector housing.

According to another aspect of the present invention, there is provided an electrical connector assembly adapted for establishing electrical connection between an electronic card and an external electronic device, the electronic card being formed with a set of conductive contacts. The electrical connector assembly comprises:

a casing having opposite front and rear open ends, the casing confining a receiving space and being formed with a connector mounting seat in the receiving space;

a circuit board mounted in the receiving space and disposed adjacent to the rear open end, the circuit board being formed with a plurality of solder contacts; and a connector disposed in the receiving space and mounted on the connector mounting seat, the connector including a dielectric connector housing having opposite top and bottom walls, and opposite lateral walls interconnecting the top and bottom walls and cooperating with the top and bottom walls so as to confine a card receiving groove, the dielectric connector housing further having a front open side for access into the card receiving groove, and a rear side, the top wall having a first inner mounting surface, and a first outer mounting surface opposite to the first inner mounting surface, the bottom wall having a second inner mounting surface, and a second outer mounting surface opposite to the second inner mounting surface, a terminal connecting board mounted on the rear side of the dielectric connector housing and having a first surface adjacent to the rear side of the dielectric connector housing, and a second surface opposite to the first surface, the terminal connecting board being formed with a plurality of circuit traces, a plurality of conductive vias extending from the first surface to the second surface and coupled electrically and respectively to the circuit traces, and a plurality of solder pads formed on the second surface, connected electrically and respectively to the solder contacts on the circuit board, and coupled electrically and respectively to the circuit traces such that each of the conductive vias is coupled electrically to a corresponding one of the solder contacts on the circuit board via a corresponding one of the circuit traces and a corresponding one of the solder pads, a set of first conductive terminals mounted on one of the first inner and outer mounting surfaces of the top wall and the second inner mounting surface of the bottom wall, each of the first conductive terminals having a first coupling end portion extending in and connected electrically to a corresponding one of the conductive vias in the terminal connecting board, and a first contacting end portion opposite to the first coupling end portion, projecting into the card receiving groove, and adapted to contact electrically a corresponding one of the conductive contacts on the electronic card when the electronic card is inserted into the card receiving groove through the front open side of the dielectric connector housing, and a set of second conductive terminals mounted on the second outer mounting surface of the bottom wall, each of the second conductive terminals having a second coupling end portion extending outwardly of the rear side of the dielectric connector housing and connected electrically and directly to a corresponding one of the solder contacts on the circuit board, and a second contacting end portion opposite to the second coupling end portion, projecting into the card receiving groove, and adapted to contact electrically a corresponding one of the conductive contacts on the electronic card when the electronic card is inserted into the card receiving groove through the front open side of the dielectric connector housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
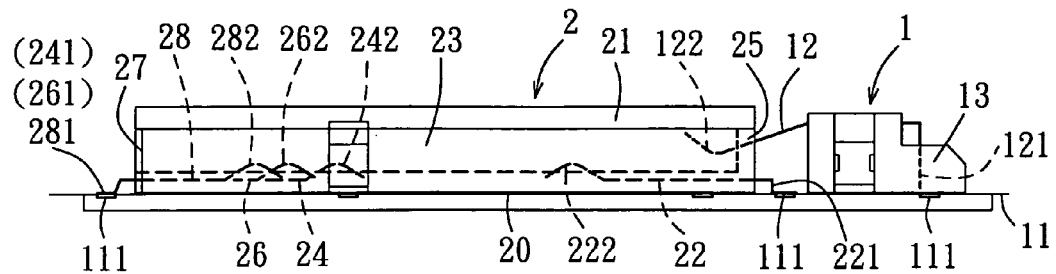
FIG. 1 is a schematic side view of a conventional electrical connector assembly.
Figure 2:
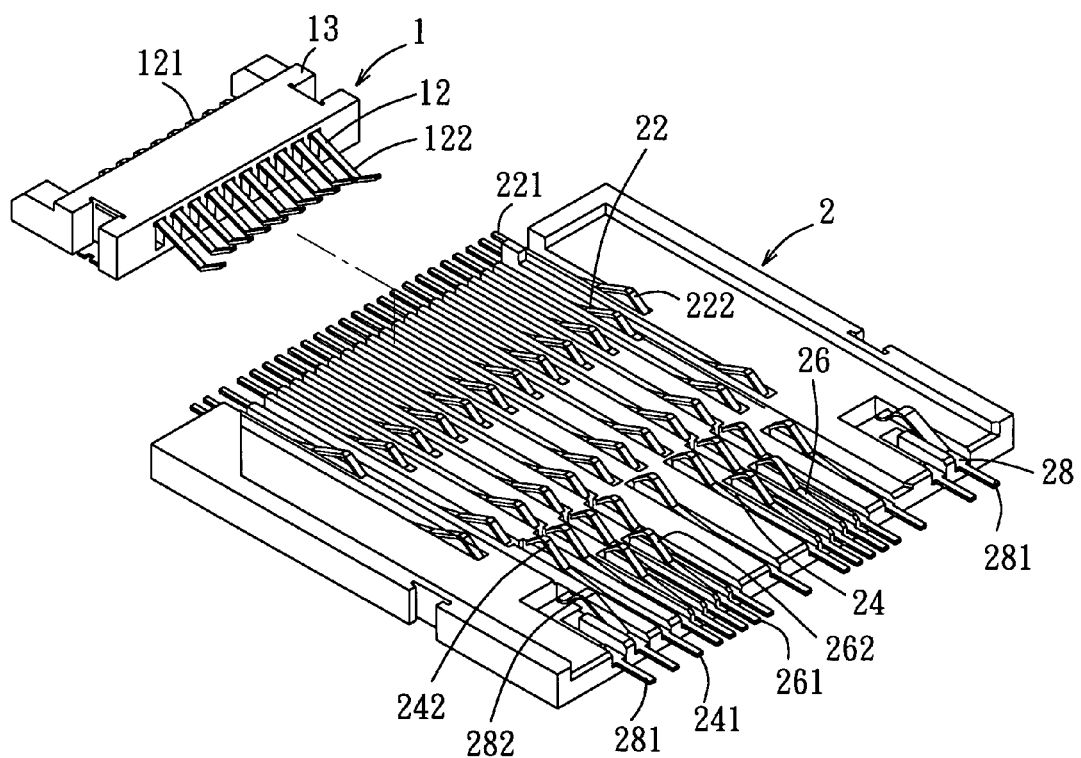
FIG. 2 is a fragmentary, partly exploded perspective view of the conventional electrical connector assembly.
Figure 3:
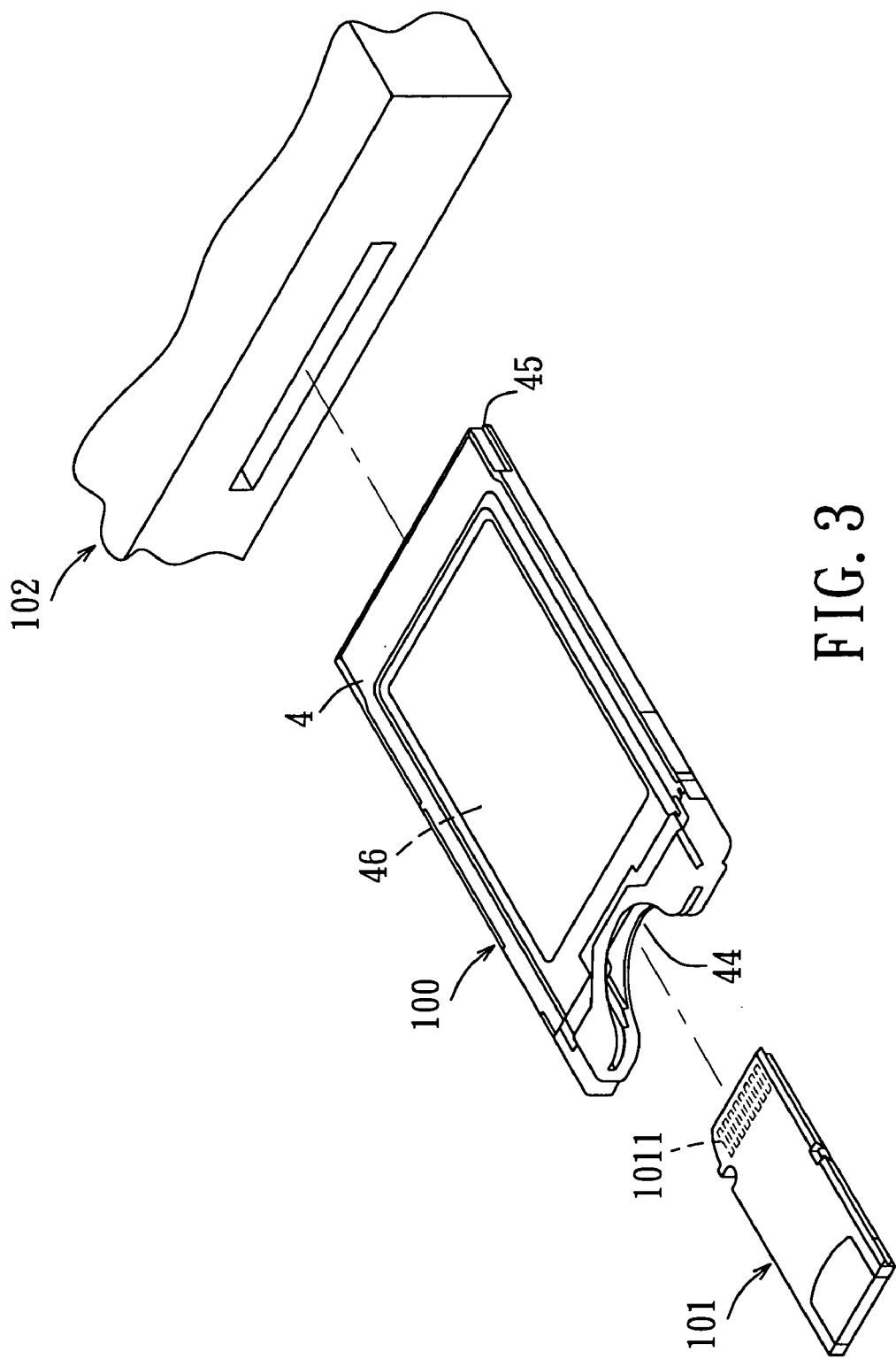
FIG. 3 is a perspective view showing the preferred embodiment of an electrical connector assembly adapted for establishing electrical connection between an electronic card and an external electronic device according to this invention.
Figure 4:
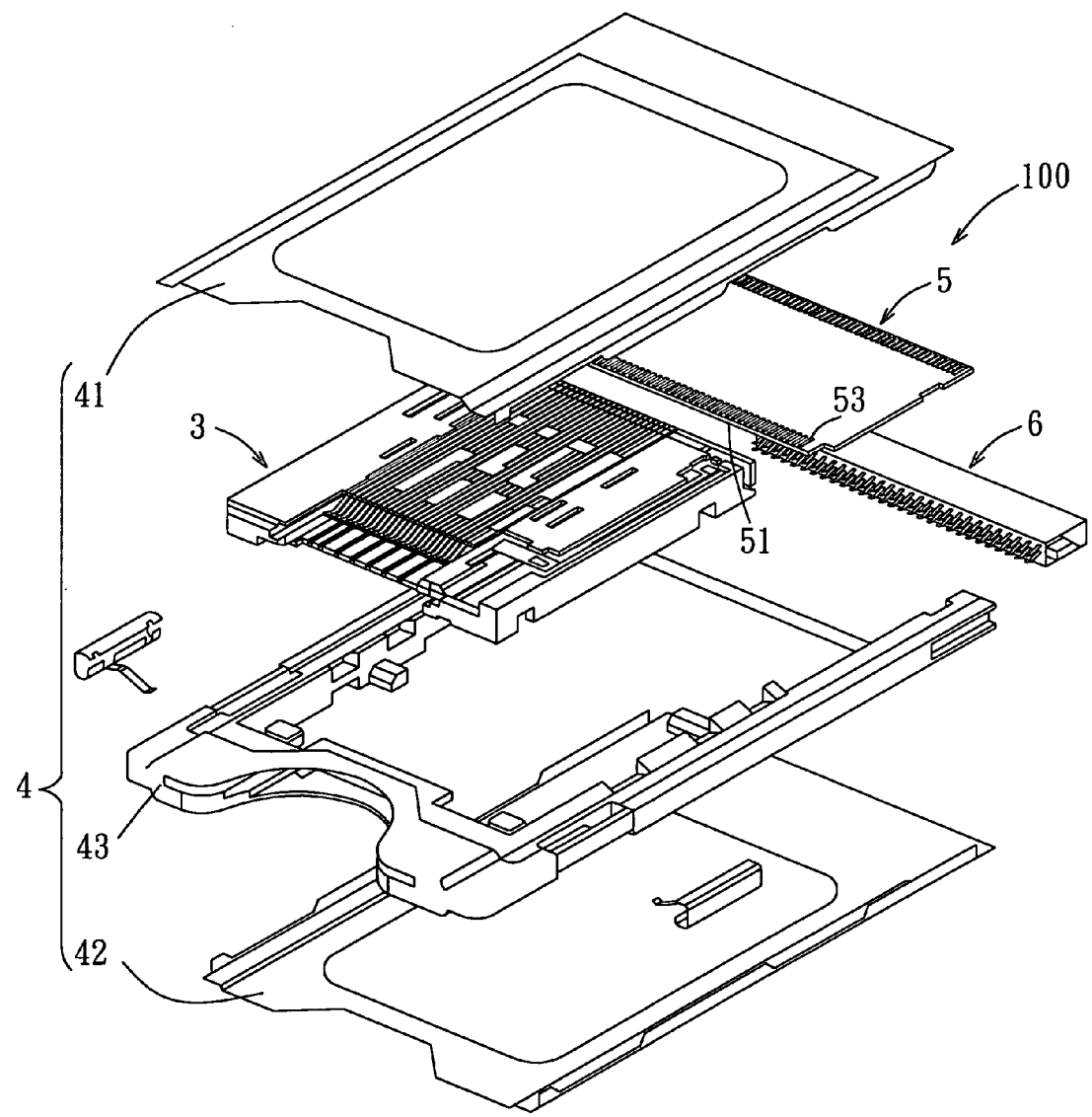
FIG. 4 is an exploded perspective view showing the preferred embodiment.

Referring to FIGS. 3 and 4, the preferred embodiment of an electrical connector assembly 100 for establishing electrical connection between an electronic card and an external electronic device 102 according to the present invention is shown. In this embodiment, the electronic card is an MS card 101 that is formed with a set of conductive contacts 1011. The electronic card can also be one of MS, SM, MMC, SD and XD cards. The electronic device 102 is a notebook computer. The electrical connector 100 includes a casing 4, a circuit board 5, a connector 3, and a PCMCIA connector 6.

The casing 4 has opposite front and rear open ends 44, 45, as best shown in FIG. 3. The casing 4 confines a receiving space 46 and is formed with a connector mounting seat 43 in the receiving space 46. In this embodiment, the casing 4 includes an upper case body 41, and a lower case body 42 provided with the connector mounting seat 43 thereon, as best shown in FIG. 4.

The circuit board 5, which is a double-layer circuit board in this embodiment, is mounted in the receiving space 46, and is disposed adjacent to the rear open end 45. The circuit board 5 is formed with a plurality of solder contacts 53 on a mounting side 51 thereof, as best shown in FIG. 4.

The connector 3 is disposed in the receiving space 46, and is mounted on the connector mounting seat 43 (see FIG. 4). Referring to FIGS. 5 to 9, the connector 3 includes a dielectric connector housing 31, a terminal connecting board 33, a set of first conductive terminals 32, a set of second conductive terminals 34, and a set of third conductive terminals 36.

Figure 5:
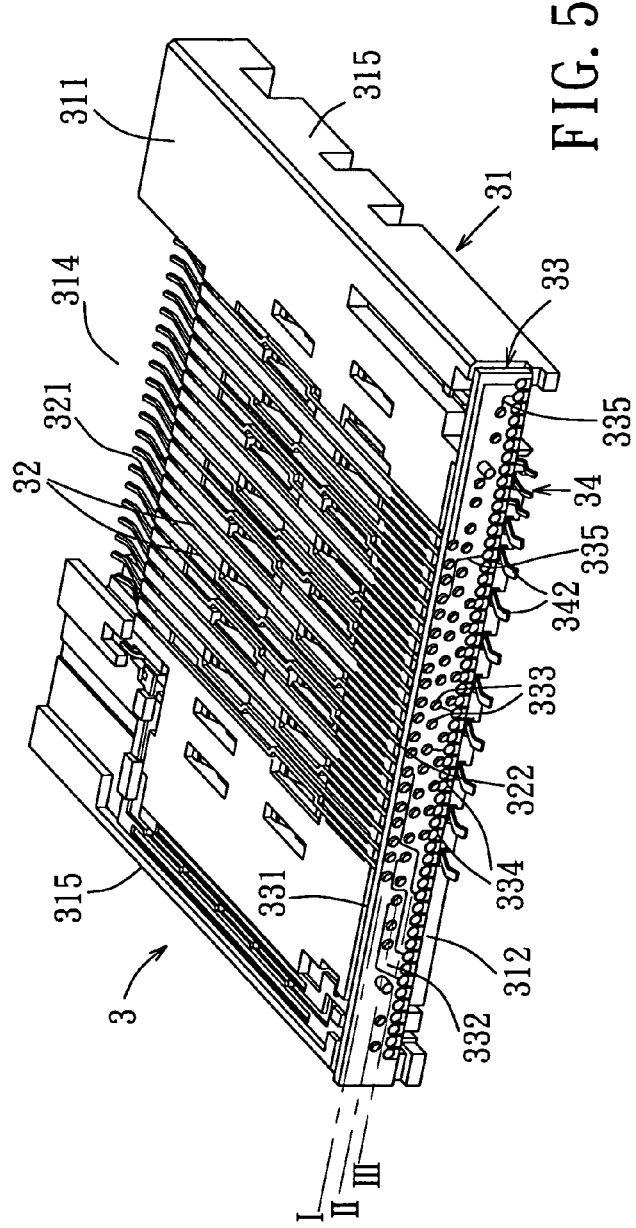
FIG. 5 is a perspective view showing a connector of the preferred embodiment.
Figure 6:
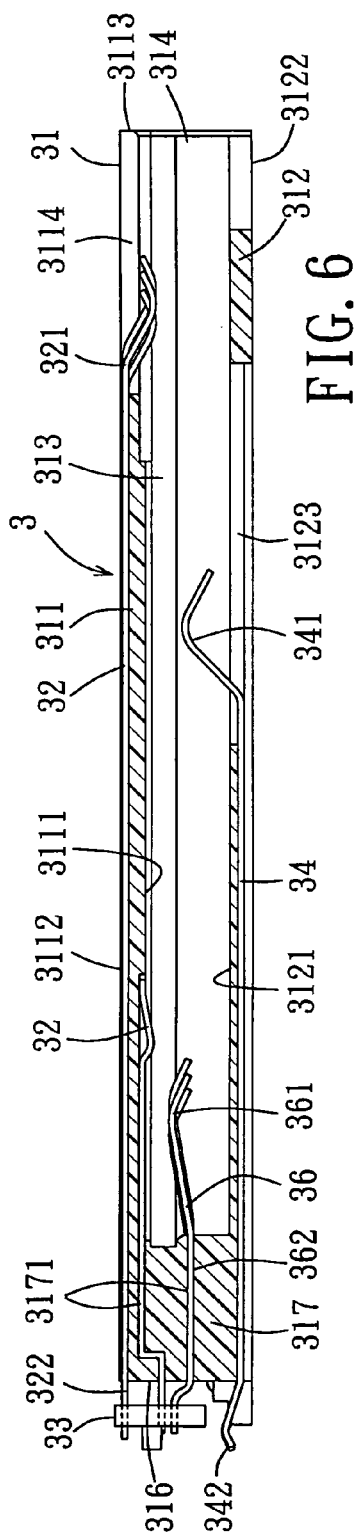
FIG. 6 is a schematic sectional view showing the connector of the preferred embodiment.

As shown in FIGS. 5 and 6, the dielectric connector housing 31 has opposite top and bottom walls 311, 312, and opposite lateral walls 315 interconnecting the top and bottom walls 311, 312 and cooperating with the top and bottom walls 311, 312 so as to confine a card receiving groove 313. The dielectric connector housing 31 further has a front open side 314 for access into the card receiving groove 313, and a rear side 316. The top wall 311 has a first inner mounting surface 3111, and a first outer mounting surface 3112 opposite to the first inner mounting surface 3111. The bottom wall 312 has a second inner mounting surface 3121, and a second outer mounting surface 3122 opposite to the second inner mounting surface 3121. In this embodiment, as shown in FIG. 6, the top wall 311 has a front end 3113 formed with a notch 3114. The bottom wall 312 is formed with a set of through holes 3123. The dielectric connector housing 31 further has a rear wall 317 formed with a plurality of mounting holes 3171.

Figure 7:
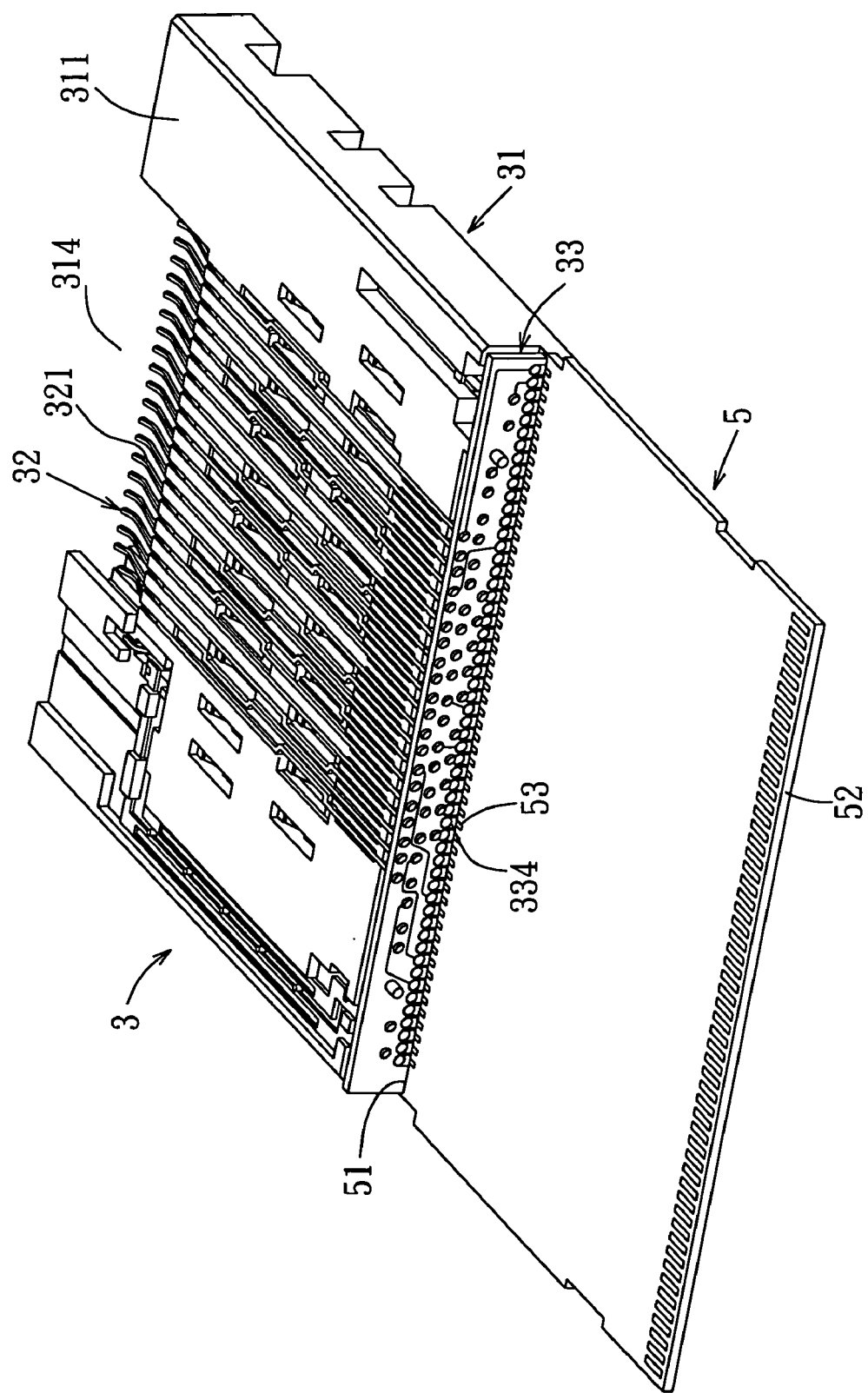
FIG. 7 is a perspective view showing the connector and a circuit board of the preferred embodiment.
Figure 8:
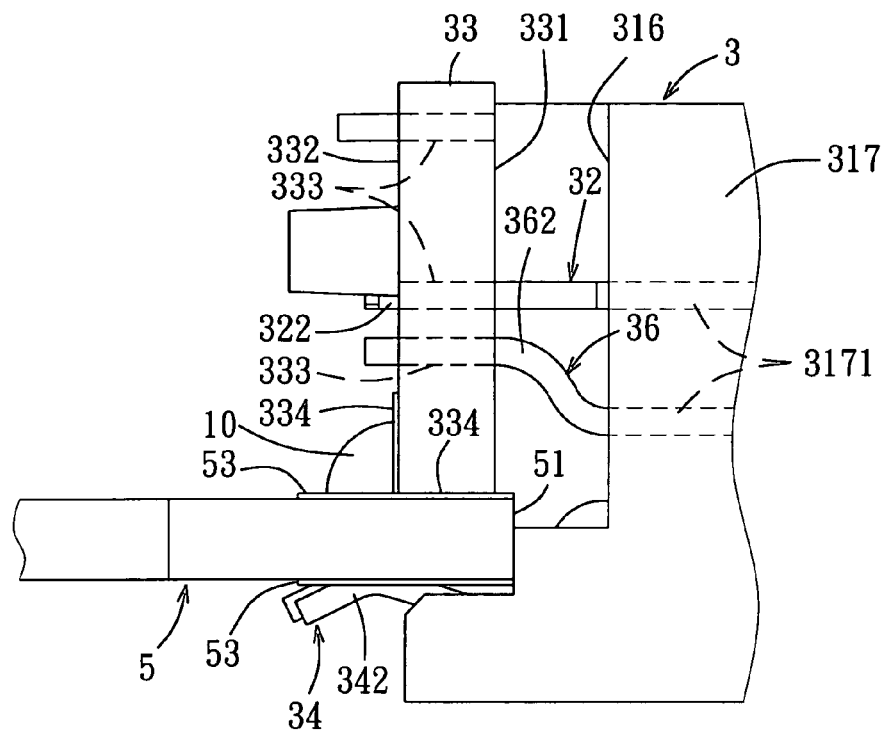
FIG. 8 is a fragmentary schematic view showing the connection between the connector and the circuit board of the preferred embodiment.

The terminal connecting board 33 is mounted on the rear side 316 of the dielectric connector housing 31, and has a first surface 331 adjacent to the rear side 316 of the dielectric connector housing 31, and a second surface 332 opposite to the first surface 331. The terminal connecting board 33 is formed with a plurality of circuit traces 335, a plurality of conductive vias 333 extending from the first surface 331 to the second surface 332, arranged along three imaginary lines I II, III shown in FIG. 5, and coupled electrically and respectively to the circuit traces 335, and a plurality of solder pads 334 formed on the second surface 332, coupled electrically and respectively to the circuit traces 35, as shown in FIG. 5, and connected electrically and respectively to the solder contacts 53 on the circuit board 5, as shown in FIG. 7, such that each of the conductive vias 333 is coupled electrically to a corresponding one of the solder contacts 53 on the circuit board 5 via a corresponding one of the circuit traces 335 and a corresponding one of the solder pads 334. In this embodiment, as best shown in FIG. 8, the mounting side 51 of the circuit board 5 is disposed adjacent to a bottom edge 336 of the terminal connecting board 33 and the rear side 316 of the dielectric connector housing 31 such that an angle is formed between the terminal connecting board 33 and the circuit board 5. The solder pads 334 of the terminal connecting board 33 are disposed adjacent to the bottom edge 336, and are coupled electrically and respectively to the solder contacts 53 on the circuit board 5 by means of solder material 10 filled in the angle. In this embodiment, the terminal connecting board 33 is disposed transverse to the circuit board 5.

In this embodiment, the first conductive terminals 32 are mounted on the inner and outer mounting surfaces 3111, 3112 of the top wall 311. More specifically, the first conductive terminals 32, which are mounted on the inner mounting surface 3111 of the top wall 311, are adapted for contacting an SM card, whereas the first conductive terminals 32, which are mounted on the outer mounting surface 3112 of the top wall 311 are adapted for contacting an XD card. Each of the first conductive terminals 32 has a first coupling end portion 322 extending in and connected electrically to a corresponding one of the conductive vias 333 in the terminal connecting board 33, and a first contacting end portion 321 opposite to the first coupling end portion 322, projecting into the card receiving groove 313, and adapted to contact electrically a corresponding one of a set of conductive contacts on the electronic card, which can be one of SM and XD cards, when the latter is inserted into the card receiving groove 313 through the front open side 314 of the dielectric connector housing 31. It is noted that the first contacting end portion 321 of each of the first conductive terminals 32, which are mounted on the first outer mounting surface 3112 of the top wall 311, extends through the notch 3114 and projects into the card receiving groove 313, as shown in FIG. 6. Furthermore, the first coupling end portion 322 of each of the first conductive terminals 32, which are mounted on the first inner surface 3111 of the top wall 311, extends through a corresponding one of the mounting holes 3171 in the rear wall 317, as shown in FIG. 6.

Figure 9:
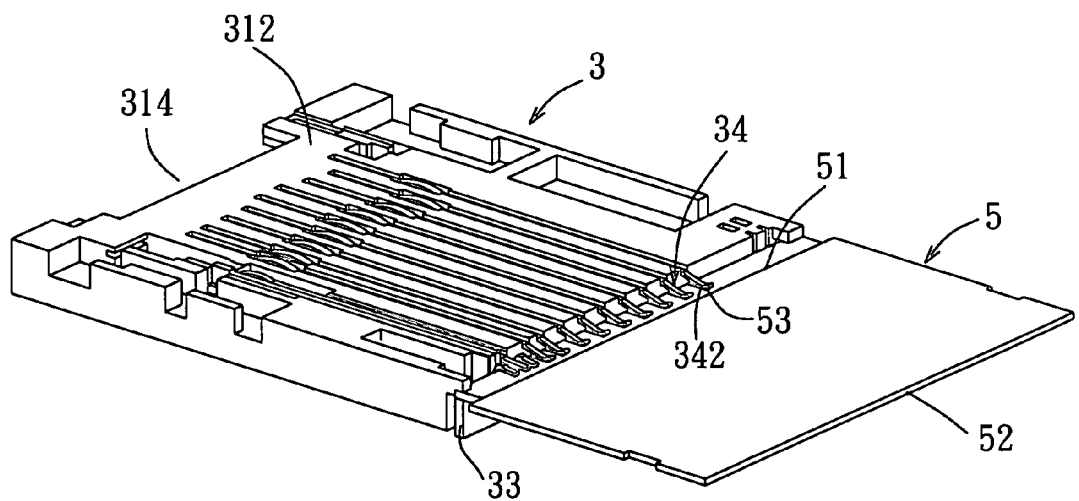
FIG. 9 is a perspective, schematic bottom view showing the connector and the circuit board of the preferred embodiment.

The second conductive terminals 34 are mounted on the second outer mounting surface 3122 of the bottom wall 312, and are adapted for contacting MMC and SD cards. Each second conductive terminal 34 has a second coupling end portion 342 extending outwardly of the rear side 316 of the dielectric connector housing 31 and connected electrically and directly to a corresponding one of the solder contacts 53 on the circuit board 5, as shown in FIGS. 8 and 9, and a second contacting end portion 341 opposite to the second coupling end portion 342, extending through a corresponding one of the through holes 3123 in the bottom wall 312 so as to project into the card receiving groove 313, and adapted to contact electrically a corresponding one of a set of conductive contacts on the electronic card, which can be one of MMC and SD cards, when the latter is inserted into the card receiving groove 313 through the front open side 314 of the dielectric connector housing 31.

The third conductive terminals 36 are adapted for contacting the MS card 101. Each third conductive terminal 36 is mounted in a corresponding one of the mounting holes 3171 in the rear wall 317, and has a third coupling end portion 362 extending outwardly of the rear wall 317 and connected electrically to a corresponding one of the conductive vias 333 in the terminal connecting board 33 (see FIGS. 6 and 8), and a third contacting end portion 361 opposite to the third coupling end portion 362, extending into the card receiving groove 313, and adapted to contact electrically a corresponding one of the conductive contacts loll on the MS card 101 when the latter is inserted into the card receiving groove 313 through the front open side 314 of the dielectric connector housing 31.

The PCMCIA connector 6 is mounted in the rear open end 45 of the casing 4, is connected electrically to the circuit board 5, and is adapted to be connected electrically to the external electronic device 102.

The following are some of the advantages attributed to the electrical connector assembly 100 of the present invention:

1. The solder pads 334 on the terminal connecting board 33 can be formed using known printed circuit board fabrication techniques such that the solder pads 334 can be formed on the terminal connecting board 33 with a higher density. The solder contacts 53 of the circuit board 5 are formed on opposite surfaces. Therefore, due to the presence of the double-layer circuit board 5 and the terminal connecting board 33, the electrical connector assembly 100 of this invention can be provided with a greater number of conductive terminals.

2. Since the solder pads 334 on the terminal connecting board 33 are registered respectively with the solder contacts 53 on the circuit board 5, electrical connection between the solder pads 334 on the terminal connecting board 33 and the solder contacts 53 on the circuit board 5 can be easily conducted using a known surface mount technology.

3. Since the circuit board 5 and the connector 3 are disposed on the same plane, the electrical connector assembly 100 of this invention has a smaller thickness than that of the aforesaid conventional electrical connector assembly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electrical connector adapted for establishing electrical connection between an electronic card and a circuit board, the electronic card being formed with a set of conductive contacts, the circuit board being formed with a plurality of solder contacts, said electrical connector comprising:

a dielectric connector housing having opposite top and bottom walls, and opposite lateral walls interconnecting said top and bottom walls and cooperating with said top and bottom walls so as to confine a card receiving groove, said dielectric connector housing further having a front open side for access into said card receiving groove, and a rear side, said top wall having a first inner mounting surface, and a first outer mounting surface opposite to said first inner mounting surface, said bottom wall having a second inner mounting surface, and a second outer mounting surface opposite to said second inner mounting surface;

a terminal connecting board mounted on said rear side of said dielectric connector housing and having a first surface adjacent to said rear side of said dielectric connector housing, and a second surface opposite to said first surface, said terminal connecting board being formed with a plurality of circuit traces, a plurality of conductive vias extending from said first surface to said second surface and coupled electrically and respectively to said circuit traces, and a plurality of solder pads formed on said second surface, adapted to be connected electrically and respectively to the solder contacts on the circuit board, and coupled electrically and respectively to said circuit traces such that each of said conductive vias is adapted to be coupled electrically to a corresponding one of the solder contacts on the circuit board via a corresponding one of said circuit traces and a corresponding one of said solder pads;

a set of first conductive terminals mounted on one of said first inner and outer mounting surfaces of said top wall and said second inner mounting surface of said bottom wall, each of said first conductive terminals having a first coupling end portion extending in and connected electrically to a corresponding one of said conductive vias in said terminal connecting board, and a first contacting end portion opposite to said first coupling end portion, projecting into said card receiving groove, and adapted to contact electrically a corresponding one of the conductive contacts on the electronic card when the electronic card is inserted into said card receiving groove through said front open side of said dielectric connector housing; and a set of second conductive terminals mounted on said second outer mounting surface of said bottom wall, each of said second conductive terminals having a second coupling end portion extending outwardly of said rear side of said dielectric connector housing and adapted to be connected electrically and directly to a corresponding one of the solder contacts on the circuit board, and a second contacting end portion opposite to said second coupling end portion, projecting into said card receiving groove, and adapted to contact electrically a corresponding one of the conductive contacts on the electronic card when the electronic card is inserted into said card receiving groove through said front open side of said dielectric connector housing.

2. The electrical connector as claimed in claim 1, wherein said top wall of said dielectric connector housing has a front end formed with a notch, said first contacting end portion of each of said first conductive terminals extending through said notch and projecting into said card receiving groove when said first conductive terminals are mounted on said first outer mounting surface of said top wall of said dielectric connector housing.

3. The electrical connector as claimed in claim 1, wherein said bottom wall of said dielectric connector housing is formed with a set of through holes, each of which permits extension of said second contacting end portion of a corresponding one of said second conductive terminals therethrough.

4. The electrical connector as claimed in claim 1, wherein said dielectric connector housing further has a rear wall formed with a plurality of mounting holes that respectively permit extension of said first coupling end portions of said first conductive terminals and said second coupling end portions of said second conductive terminals therethrough.

5. The electrical connector as claimed in claim 4, further comprising a set of third conductive terminals, each of which is mounted in a corresponding one of said mounting holes in said rear wall, and has a third coupling end portion extending outwardly of said rear wall and connected electrically to a corresponding one of said conductive vias in said terminal connecting board, and a third contacting end portion opposite to said third coupling end portion, extending into said card receiving groove, and adapted to contact electrically a corresponding one of the conductive contacts on the electronic card when the electronic card is inserted into said card receiving groove through said front open end of said dielectric connector housing.

6. An electrical connector assembly adapted for establishing electrical connection between an electronic card and an external electronic device, the electronic card being formed with a set of conductive contacts, said electrical connector assembly comprising:

a casing having opposite front and rear open ends, said casing confining a receiving space and being formed with a connector mounting seat in said receiving space;

a circuit board mounted in said receiving space and disposed adjacent to said rear open end, said circuit board being formed with a plurality of solder contacts; and a connector disposed in said receiving space and mounted on said connector mounting seat, said connector including a dielectric connector housing having opposite top and bottom walls, and opposite lateral walls interconnecting said top and bottom walls and cooperating with said top and bottom walls so as to confine a card receiving groove, said dielectric connector housing further having a front open side for access into said card receiving groove, and a rear side, said top wall having a first inner mounting surface, and a first outer mounting surf ace opposite to said first inner mounting surf ace, said bottom wall having a second inner mounting surface, and a second outer mounting surface opposite to said second inner mounting surface, a terminal connecting board mounted on said rear side of said dielectric connector housing and having a first surface adjacent to said rear side of said dielectric connector housing, and a second surface opposite to said first surf ace, said terminal connecting board being formed with a plurality of circuit traces, a plurality of conductive vias extending from said first surface to said second surface and coupled electrically and respectively to said circuit traces, and a plurality of solder pads formed on said second surface, connected electrically and respectively to said solder contacts on said circuit board, and coupled electrically and respectively to said circuit traces such that each of said conductive vias is coupled electrically to a corresponding one of said solder contacts on said circuit board via a corresponding one of said circuit traces and a corresponding one of said solder pads, a set of first conductive terminals mounted on one of said first inner and outer mounting surfaces of said top wall and said second inner mounting surface of said bottom wall, each of said first conductive terminals having a first coupling end portion extending in and connected electrically to a corresponding one of said conductive vias in said terminal connecting board, and a first contacting end portion opposite to said first coupling end portion, projecting into said card receiving groove, and adapted to contact electrically a corresponding one of the conductive contacts on the electronic card when the electronic card is inserted into said card receiving groove through said front open side of said dielectric connector housing, and a set of second conductive terminals mounted on said second outer mounting surface of said bottom wall, each of said second conductive terminals having a second coupling end portion extending outwardly of said rear side of said dielectric connector housing and connected electrically and directly to a corresponding one of said solder contacts on said circuit board, and a second contacting end portion opposite to said second coupling end portion, projecting into said card receiving groove, and adapted to contact electrically a corresponding one of the conductive contacts on the electronic card when the electronic card is inserted into said card receiving groove through said front open side of said dielectric connector housing.

7. The electrical connector assembly as claimed in claim 6, wherein said top wall of said dielectric connector housing has a front end formed with a notch, said first contacting end portion of each of said first conductive terminals extending through said notch and projecting into said card receiving groove when said first conductive terminals are mounted on said first outer mounting surface of said top wall of said dielectric connector housing.

8. The electrical connector assembly as claimed in claim 6, wherein said bottom wall of said dielectric connector housing is formed with a set of through holes, each of which permits extension of said second contacting end portion of a corresponding one of said second conductive terminals therethrough.

9. The electrical connector assembly as claimed in claim 6, further comprising a PCMCIA connector mounted in said rear open end of said casing, connected electrically to said circuit board, and adapted to be connected electrically to the external electronic device.

10. The electrical connector assembly as claimed in claim 6, wherein said circuit board has a mounting side formed with said solder contacts and disposed adjacent to a bottom edge of said terminal connecting board and said rear side of said dielectric connector housing such that an angle is formed between said terminal connecting board and said circuit board, said solder pads of said terminal connecting board being disposed adjacent to said bottom edge of said terminal connecting board and being coupled electrically and respectively to said solder contacts on said circuit board by means of solder material filled in the angle.

11. The electrical connector assembly as claimed in claim 10, wherein said terminal connecting board is disposed transverse to said circuit board.

12. The electrical connector assembly as claimed in claim 6, wherein said dielectric connector housing further has a rear wall formed with a plurality of mounting holes that respectively permit extension of said first coupling end portions of said first conductive terminals therethrough when said first conductive terminals are mounted on one of said first inner surface of said top wall and said second inner surface of said bottom wall.

13. The electrical connector assembly as claimed in claim 12, further comprising a set of third conductive terminals, each of which is mounted in a corresponding one of said mounting holes in said rear wall, and has a third coupling end portion extending outwardly of said rear wall and connected electrically to a corresponding one of said conductive vias in said terminal connecting board, and a third contacting end portion opposite to said third coupling end portion, extending into said card receiving groove, and adapted to contact electrically a corresponding one of the conductive contacts on the electronic card when the electronic card is inserted into said card receiving groove through said front open side of said dielectric connector housing.

* * * * *